US010203412B2

(12) United States Patent
Smith et al.

(10) Patent No.: US 10,203,412 B2
(45) Date of Patent: Feb. 12, 2019

(54) POSITIONING SYSTEM

(71) Applicant: Caterpillar Inc., Peoria, IL (US)

(72) Inventors: David William Smith, Queensland (AU); Peter John Broughton, Victoria (AU)

(73) Assignee: Caterpillar Inc., Deerfield, IL (US)

(*) Notice: Subject to any disclaimer, the term of this patent is extended or adjusted under 35 U.S.C. 154(b) by 260 days.

(21) Appl. No.: 15/021,760

(22) PCT Filed: Sep. 20, 2013

(86) PCT No.: PCT/US2013/061032
§ 371 (c)(1),
(2) Date: Mar. 14, 2016

(87) PCT Pub. No.: WO2015/041689
PCT Pub. Date: Mar. 26, 2015

(65) Prior Publication Data
US 2016/0223673 A1 Aug. 4, 2016

(51) Int. Cl.
G01C 3/08 (2006.01)
G01S 17/42 (2006.01)
(Continued)

(52) U.S. Cl.
CPC ............ G01S 17/42 (2013.01); G01S 5/0252 (2013.01); G01S 17/89 (2013.01)

(58) Field of Classification Search
CPC ......... G01S 17/89; G01S 17/42; G01S 5/0252
(Continued)

(56) References Cited

U.S. PATENT DOCUMENTS 5,483,455 A 1/1996 Lay et al.
6,608,913 B1 * 8/2003 Hinton ............... B82Y 15/00
382/104
(Continued)

FOREIGN PATENT DOCUMENTS

JP         10300493     11/1998
JP         2012026888    2/2012
WO      WO 2008/094993   8/2008

OTHER PUBLICATIONS

Masahiro Tomono, "Robust Robot Localization Using Global Scan Matching and Multiple Hypothesis Tracking", Proceedings of the 22nd Annual Conference of the RSJ CR-Rom, The Robotics Society of Japan, 1B12, Sep. 15, 2004.
(Continued)

Primary Examiner — Mark Hellner
(74) Attorney, Agent, or Firm — Finnegan, Henderson, Farabow, Garrett & Dunner, LLP

(57) ABSTRACT

A method for determining a position of a machine is disclosed. The method may include determining, using a Lidar unit on the machine, input data associated with distances between the Lidar unit and respective light-reflective points in the worksite. The method may also include comparing the input data with comparison data. The comparison data may have reference data sets indicative of distances between reference positions and the respective light-reflective points in the worksite. The reference positions may have a fixed location in the worksite. The method may further include determining the position of the machine as the reference position corresponding to a reference data set that correlates with the input data set.

17 Claims, 6 Drawing Sheets

(51) Int. Cl.
*G01S 17/89* (2006.01)
*G01S 5/02* (2010.01)

(58) Field of Classification Search
USPC .......................................................... 356/4.01
See application file for complete search history.

(56) References Cited

U.S. PATENT DOCUMENTS

| | | | |
|---|---|---|---|
| 7,392,151 B2 * | 6/2008 | Makela | G01C 21/30 |
| | | | 702/150 |
| 8,301,374 B2 | 10/2012 | Surampudi et al. | |
| 8,972,095 B2 * | 3/2015 | Furuno | G05D 1/024 |
| | | | 701/23 |
| 2002/0130806 A1 | 9/2002 | Taylor, Jr. et al. | |
| 2004/0239552 A1 | 12/2004 | Chon et al. | |
| 2007/0073473 A1 | 3/2007 | Altan et al. | |
| 2008/0068267 A1 | 3/2008 | Huseth et al. | |
| 2010/0110412 A1 | 5/2010 | Basu et al. | |
| 2011/0262008 A1 | 10/2011 | Holicki et al. | |
| 2012/0163656 A1 | 6/2012 | Wang et al. | |
| 2013/0103298 A1 | 4/2013 | Becker et al. | |

OTHER PUBLICATIONS

International Search Report dated Apr. 29, 2014, in Patent Application No. PCT/US2013/061032 by the Korean Intellectual Property Office (2 pages).
International Search Report dated Apr. 29, 2014, in Patent Application No. PCT/US2013/061028 by the Korean Intellectual Property Office (2 pages).
U.S. National Stage Application of David William Smith et al. titled "Positioning System Using Radio Frequency Signals," filed Mar. 14, 2016.

* cited by examiner

POSITIONING SYSTEM

CLAIM FOR PRIORITY

This application is a U.S. National Phase entry under 35 U.S.C. § 371 from PCT International Application No. PCT/US2013/061032, filed Sep. 20, 2013, which is incorporated herein by reference.

TECHNICAL FIELD

The present disclosure relates generally to a positioning system for a mobile machine. The positioning system is especially relevant to high-precision position determination of mobile machines in underground environments.

BACKGROUND

Machines such as, for example, haul trucks, drills, loaders, conveyors, and other types of heavy equipment are commonly used in underground mining applications to perform a variety of tasks. Unlike above-ground mining applications, underground mining sites do not have access to GPS (Global Positioning System) signals, yet knowledge of a machine's on-site location is desirable, for example, with respect to the site geography.

In some underground mining applications, Lidar (Light Detection and Ranging; also referred to as light radar) positioning systems may be used to track the location of a machine with respect to a worksite. Lidar systems scan portions of the surrounding environment in proximity of the machine. Each Lidar scan captures data representative of the shape of the scanned portion of the worksite. The captured data is then compared to references for a known map of the worksite, and the positioning system infers the position of the machine based on the reference that correlates with the captured data. The positioning system is able to track the movement of the machine by subsequently capturing a further Lidar scan, and similarly comparing this captured data with the mapped references.

In some applications, however, it may be difficult for Lidar systems to determine the location of a machine based solely on correlating the captured data with the mapped references. For instance, the captured data may represent shapes that are not unique to a specific location. Additionally, comparing the captured data with the map can be computationally intensive, causing processing systems to be slow in finding a matching reference. Further, there may be objects at the worksite that do not have a permanent location or that have been newly added. Such objects may cause complications for Lidar systems that are trying to match shapes in the worksite environment to a pre-existing map if those shapes are not included in the pre-existing map. This may result in the Lidar system losing track of the position of the machine, requiring manual intervention by an operator on the machine, who must identify the machine's position and re-seed the positioning system.

The disclosed positioning system is directed to overcoming or at least ameliorating one or more of the problems set forth above.

SUMMARY

In one aspect, the present disclosure is directed to a method for determining a position of a machine in a worksite. The method comprises determining input data associated with a Lidar survey, by a Lidar unit on the machine at the position in the worksite. The input data is associated with distances between the Lidar unit and respective light-reflective points in the worksite. The input data is compared with first comparison data consisting of one or more reference data. Each of the one or more reference data of the first comparison data is indicative of a Lidar survey captured from a corresponding known reference position at a landmark that is at a fixed location in the worksite. In the event that the comparison meets a predefined condition, a first position of the machine is determined based on a reference data corresponding to the input data.

In another aspect, the present disclosure is directed to a system for determining a position of a machine in a worksite. The system comprises a Lidar unit configured to perform a Lidar survey. The system further comprises a controller in communication with the Lidar unit. The controller is configured to determine input data associated with a Lidar survey, by the Lidar unit on the machine at the position in the worksite. The input data is associated with distances between the Lidar unit and respective light-reflective points in the worksite. The controller compares the input data with first comparison data consisting of one or more reference data. Each of the one or more reference data of the first comparison data is indicative of a Lidar survey captured from a corresponding known reference position at a landmark that is at a fixed location in the worksite. In the event that the comparison meets a predefined condition, the controller determines a first position of the machine based on a reference data corresponding to the input data.

As used herein, the term "comprises" (and grammatical variants thereof) is used inclusively and does not exclude the existence of additional features, elements or steps.

BRIEF DESCRIPTION OF THE DRAWINGS

Various aspects and features of an embodiment of the invention will be described with reference to the following figures which are provided for the purposes of illustration and by way of non-limiting example only.

DETAILED DESCRIPTION

Figure 1:
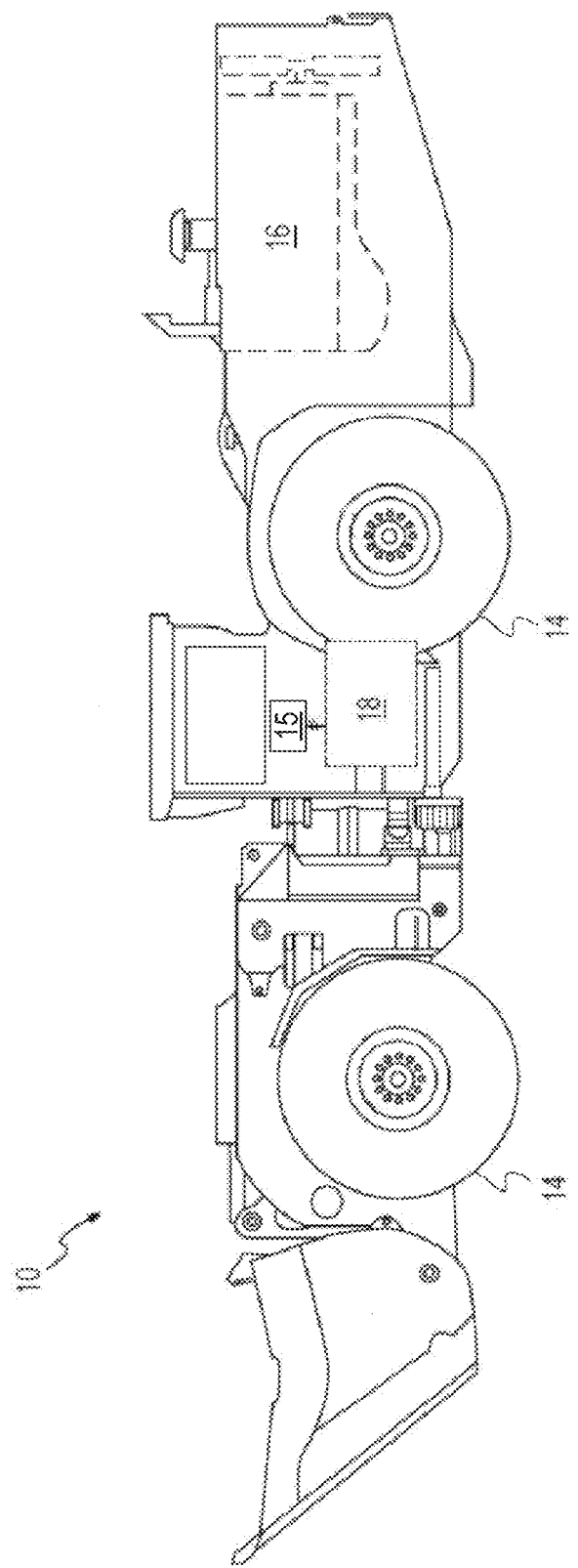
FIG. 1 is a pictorial illustration of an exemplary disclosed machine.

FIG. 1 illustrates a machine 10 having an exemplary disclosed positioning system. Machine 10 embodies a mobile machine configured to perform one or more operations associated with an industry such as mining, construction, farming, transportation, or any other industry known in the art. For example, machine 10 may be a load-moving machine such as a haul truck, a loader, an excavator, a wheel tractor, a scraper, or any other like machine. Machine 10 may be used above-ground or underground. For example, FIG. 1 more specifically illustrates an underground mining load-haul-dump (LHD) loader, which may be used to access a load site in a mine (e.g. from a drawpoint), haul a load away from the load site, and release the load at a dump site (e.g. at an ore pass). Machine 10 may be manually controlled, semi-autonomously controlled, or fully-autonomously controlled. Machine 10 may include, among other things, one or more traction devices 14 that propel machine 10, movement sensors 15 that sense various movements of machine 10, a power source 16, and a controller 18. Controller 18 may be in communication with movement sensors 15, power source 16, and/or drive traction devices 14, and may be configured to regulate operation of power source 16 in response to various inputs, for example, from an operator input device and/or movement sensors 15, to drive traction devices 14 and propel machine 10 in a desired manner. Controller 18 may also receive information from movement sensors 15 indicative of, for example, velocity, acceleration, and/or turning rate of machine 10, and may be configured to compute various motions, such as distance and direction traversed by machine 10, based on such information.

Controller 18 includes a processor, and a memory system 19 comprised of a memory module and/or a storage module. Optionally, one or more of the processor, memory module, and/or storage module may be included together in a single apparatus. Alternatively, one or more of the processor, memory module, and/or storage module may be provided separately. The processor may include one or more known processing devices, such as a microprocessor. Memory module may include one or more devices, such as random-access memory (RAM), configured to store information used dynamically by controller 18 to perform functions related to the various operations of machine 10. The storage module may include any type of storage device or computer readable medium known in the art. For example, the storage module may comprise a magnetic, semiconductor, tape, optical, removable, non-removable, volatile, and/or non-volatile storage device. The storage module may store programs, algorithms, maps, look-up tables, and/or other information associated with determining a position of machine 10 in worksite 20. The functions of both the storage module and memory module may be performed by a single memory/storage device.

In various exemplary embodiments, controller 18 is utilized in determining the position of machine 10 as will be described in greater detail below.

Figure 2:
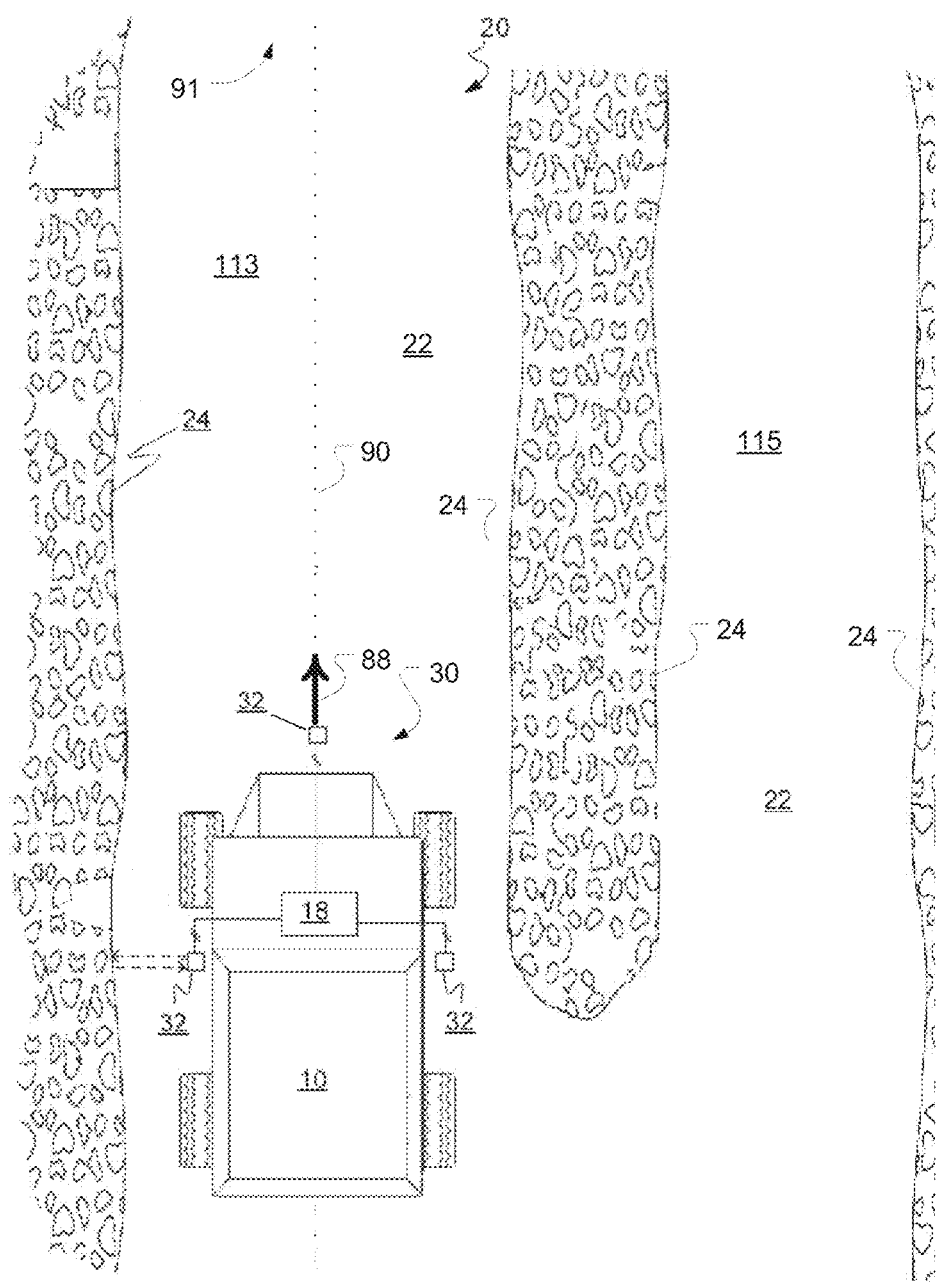
FIG. 2 is a pictorial illustration of an exemplary positioning system that may be used with the machine of FIG. 1.

FIG. 2 illustrates machine 10 performing a task at a worksite 20. Worksite 20 may be any worksite having a roadway 22 traversable by machine 10, but exemplary embodiments are particularly suited to worksites which do not having access to a GPS navigation system. For the exemplary embodiments illustrated herein, worksite 20 is an underground mine site, which does not have access to GPS navigation systems. Roadway 22 is bordered by side walls 24, such as walls of an underground tunnel, and may have a ceiling, such as a tunnel roof (not shown) disposed above roadway 22. In some applications, there may also be objects other than side walls 24 such as other machines, barrels, poles, geological features, and other like obstacles disposed in various locations at worksite 20 relative to roadway and/or the additional objects described above. In various situations, it may be desirable to ascertain position information of machine 10 in worksite 20. The position information may be used by machine 10 in navigating worksite 20. Alternatively, the position information may be used to monitor and gather data about how efficiently machine 10 and other machines in worksite 20 are performing various tasks.

In exemplary embodiments, a position of machine 10 in worksite 20 is determined by utilizing a positioning system 30. As illustrated in FIG. 2, positioning system 30 includes, among other things, controller 18, and an optical sensing device, which in this case is a Lidar unit 32. Lidar unit 32 is utilized to scan objects surrounding machine 10, such as roadway 22, side walls 24, the ceiling of an underground tunnel, and/or any other object associated with worksite 20, using light signals. Lidar unit 32 may be located on a frame and/or body of machine 10, such as at the front, back, side, top, and/or any other place on machine 10. In the example in FIG. 2, there are multiple Lidar units 32 disposed on machine 10. Each Lidar unit 32 located at a unique location on machine 10, specifically, the front and the respective sides. The Lidar unit 32 includes one or more sources light (i.e. infrared, visible or ultraviolet light), and/or one or more light detectors to survey the surrounding environment by obtaining information related to roadway 22, side walls 24, the ceiling, and/or any other object associated with worksite 20.

The light sources are lasers that emit light that reflects off of, for example, the surfaces of side walls 24 and/or other surfaces of objects in worksite 20 within a field of view of the Lidar unit 32. The light may be emitted by a single laser that is reflected by a rotating mirror to scan the portion of the worksite in the field of view. Alternatively, the light may be emitted by multiple lasers directed to different angles within the field of view so to radiate light across the field of view a non-scanning manner. One or more detectors of the Lidar unit 32 receive the reflected light and send signals to controller 18 indicative of the light received. Controller 18 then calculates distances to the various points on the surfaces. The calculated distances are based on the elapsed time between emission of the light and detection of the light, the distance to the surface being half of the elapsed time multiplied by the speed of light. However, since the elapsed times and the associated distances are intrinsically related, it is considered herein that either the elapsed time or the calculated distance may be considered to define distance data. In other embodiments, at least part of the controller 18 is integrated into Lidar unit 32. In this case, the Lidar unit 32 calculates the elapsed times or distances to the respective points on the surface(s) of the worksite that were scanned or otherwise surveyed by the Lidar unit 32. The Lidar unit 32 may then send the calculated times or distances to external components of the controller 18, or to some other processing system, for further analysis.

In one embodiment, at least one of Lidar units 32 is comprised of multiple Lidar devices treated as a single device by the controller 18. In such an embodiment, two Lidar devices are integrated back-to-back, to form one Lidar unit 32. Each Lidar device has a 180 degree field of view such that the Lidar unit 32 has a 360 degree field of view. The Lidar unit 32 may be mounted atop the machine 10 to provide the controller 18 with distance data for a 360 degree view around the machine 10. The distance data may be provided in terms of elapsed times or distances for respective angles with respect to a reference vector 88. As illustrated in FIG. 2, the reference vector 88 may, for example, be a tangential vector along a path 90 along the roadway 22, for example along a centerline of the roadway, and towards a reference end 91 of the roadway. By recording data for a 360 degree view, the Lidar unit 32 may potentially present distance data representing the entire worksite from the perspective of the Lidar unit's position in the worksite. However, topology of the worksite and the position of the Lidar unit 32 therein, some parts of the worksite might not be visible to the Lidar unit 32. Alternatively, some parts of the worksite may not be visible if the Lidar unit has a field of view less than 360 degrees. In either case, the presented distances data may represent only a portion or portions of the worksite that are visible from the Lidar unit 32.

Figure 3:
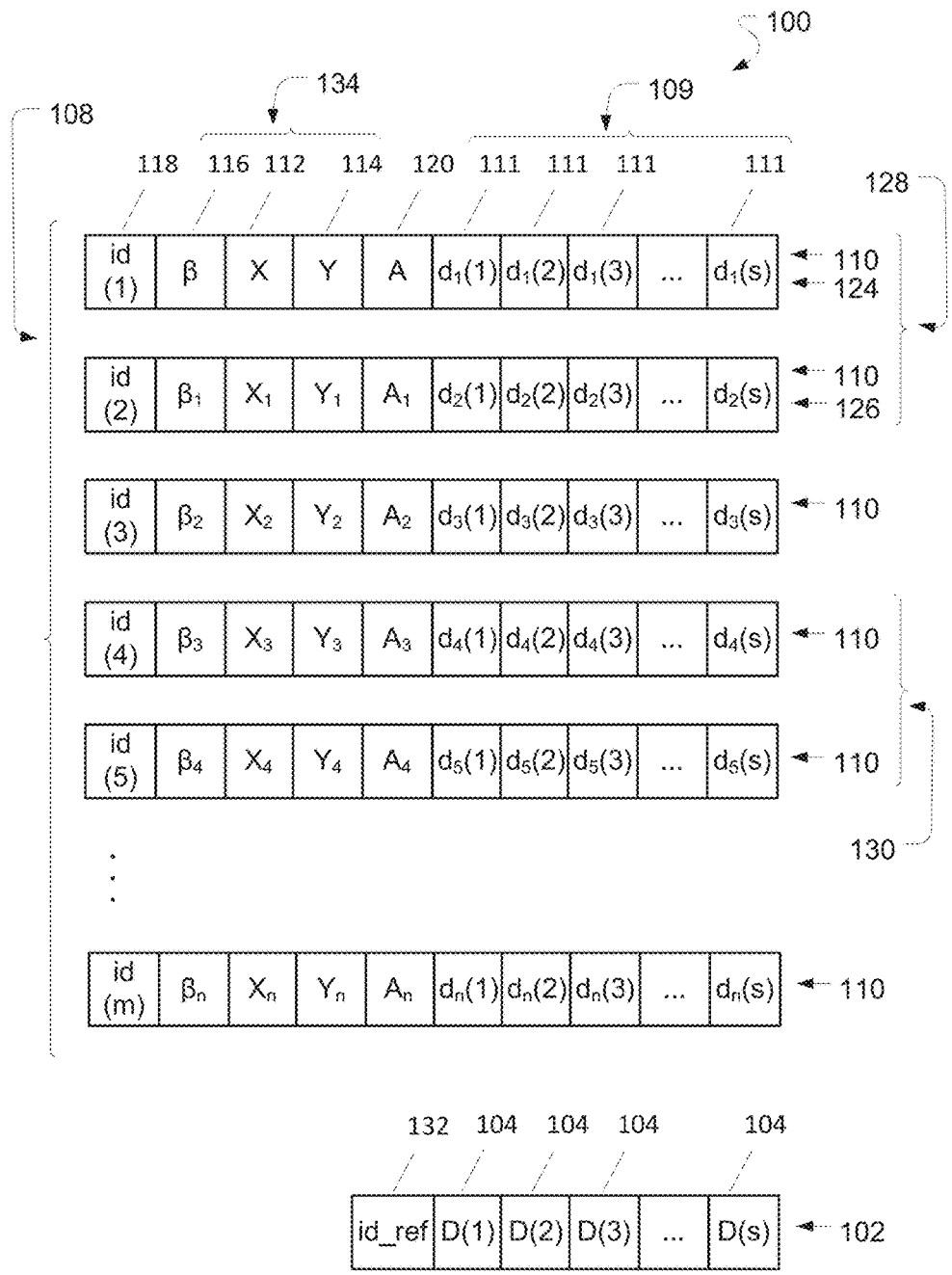
FIG. 3 is a conceptual representation of data which may used by the positioning system of FIG. 2 to determine a position of the machine.

FIG. 3 is a conceptual representation of data 100 that is analyzed by controller 18 to determine a position of Lidar unit 32 and the machine 10 on which it is mounted. The data 100 may be read from a memory system of the controller 18 on which data may be stored. However, in various embodiments, at least some of the data 100 is dynamically generated from stored data, such as a stored map of the mine. Other elements of data 100 may be read from other inputs to controller 18 such as from Lidar unit 32. The data 100 includes distance data derived from the Lidar unit 32. The distance data is a series of measured distance values, D(1) to D(s) 104, for each respective angles within the field of view and at known angular offsets with respect to the reference vector 88 or some other frame of reference. In FIG. 3, the distance data is represented as a linear one dimensional array. In other embodiments, the distance data may be indexed as a circular array. In one embodiment, in which the Lidar unit has a 360 degree field of view, the input data consists of 720 measured distance values 104, with the data elements for distance measurements that are radially spaced around the Lidar unit 32 in 0.5 degree increments. Based on the distance data, controller 18 may also estimate, calculate, and/or otherwise determine a shape of the scanned object or portion of the worksite. Some shape-related information can be extracted from the distance data by employing a mathematical filter. For example, the distance data may be transformed to a frequency domain and then passed through a high pass filter to identify edges or contour changes on the surface of the worksite. Other characterizing features of the distance data may be extracted using other known feature extraction algorithms. Such extracted information that characterizes the distance data can optionally be stored, instead of the raw distance values 104, as input data 102 for use by controller 18 in determining the position of machine 10. However, in the exemplary embodiment described, the input data 102 consists of the linear array of distance values D(1) to D(s).

The memory system 19 stores, amongst other things, data that represents a map of worksite 20. The map may be represented by data defining a collection of lines linking various coordinates in the worksite, for example, as in a DXF file of a mine map. The map may be representative of the entire worksite 20 or a portion thereof, such as at least one assigned tunnel 113 in the worksite 20, within which machine 10 is permitted or assigned to operate. The map may also include other tunnels 115 in which machine 10 is not permitted or assigned to operate. During operation, controller 18 dynamically generates reference data 109 which are each indicative of a lidar survey from a particle reference position 118. For a given reference position 134, the reference data 109 is generated from the lidar map file by generating a theoretical Lidar survey based on the respective distances 111 from the reference position 134 to various points on the mine map. For example, the points may be points along lines of the mine map, which are representative of walls 24 of the worksite. In one embodiment, the points are spread around the reference position 134 so as to represent a Lidar survey have a 360 degree field of view about the reference position 134. In one embodiment, the distances 111, for convenience referred to herein as reference distance values, are spaced in 0.5 degree intervals about the reference position 134 so as to provide 720 reference distance values. Alternatively, if the Lidar unit 32 uses other spacing, the spacing of reference distance values may be matched to the spacing associated with Lidar unit 32.

The reference data 109 generated by controller 18 are represented in FIG. 3 as part of worksite data 108. The worksite data 108 consists of a set of reference items 110, numbering M references in total. In the illustration in FIG. 3, each reference item consists of a reference identifier 118, a reference position 134, reference data 109 for that reference position 134, and other data 116. The number M of reference items 110 is determined by the finite resolution of points on the map. Each point corresponds to a reference position 134 from which reference data 109 may be generated. In one embodiment, the map points (and reference data 109 generated therefrom) included in the worksite data 108 are restricted to those points within a limited region of worksite 20. For example, the worksite data 108 may be limited to points within a portion of the worksite 20 in which the machine 10 is assigned to operate. For example, in one embodiment, the controller 18 is programmed to limit the reference positions 134 in the worksite data 108 only to reference positions along a path 90 that runs along a longitudinally extending centerline of the roadway 22, and along which the machine 10 is assumed to operate. However, it is appreciated, that since the reference data 109 are dynamically derived, the worksite data 108 need not be stored in the memory system 19 of controller 21, provided it can be derived from the worksite map and any other data stored in the memory system 19. Accordingly, not all of the reference data that make up the worksite data 108 need to co-exist at the same time. In one embodiment, only one reference data 109 exists at any one time.

In other embodiments, all reference data 109 corresponding to the worksite data 108 may be concurrently stored in memory system 19. For example, the worksite data 108 may be derived by performing Lidar scans for respective positions within the worksite 20. Each Lidar scan may be pre-captured by mobile machine 10 or by another equivalently equipped and configured mobile machine or some other surveying tool. Each set of reference distance values 111 that make up a reference data 109 may then be derived in the same manner as the input data 102 so, for example, may similarly represent a Lidar survey for 360 degree field of view, represented by 720 reference distance values. Whether the worksite data is stored or is dynamically generated as required, it is convenient to refer to the worksite data as a dataset.

Reference identifier 118 may be used to index each reference item 110. For example, the reference identifier 118 may represent a starting address, e.g. in a random access memory, from which information in the corresponding reference item 110 may accessed. The reference position 134 corresponding to each reference data 109 may be stored as an x coordinate 112 and a y coordinate 114 with respective to a frame of reference. For example the x coordinate may be correspond to a position along and east/west axis and y may correspond to a position along a north/south axis. Alternatively, one of the coordinates 112 or 114 may represent a distance along the path 90 that runs along the roadway 22, e.g. along a longitudinally extending centerline of the roadway 22. In this case the worksite data 108 may consist of reference items 110 spread along the length of path 90. For example, the reference positions 134 may be spaced or generated to be spaced in 1 meter increments, along some or all of a tunnel that typically spans 50-200 m. Each reference data 109 is indicative of a specific orientation of a Lidar survey with respect to a frame of reference in the worksite 20. For example, a reference distance value $d_1(1)$ in reference item 124 may be aligned with reference vector 88 tangential to the machine's travel path 90. Another reference item 126 may have a frame of reference that is offset by an angle β (116) with respect to the reference vector. For example, a translation of 45 degrees may be employed so that for a 720 element matrix representing 360 degrees, vector 88 is aligned with element $d_2(91)$, rather than $d_2(1)$. In one embodiment, there are 16 reference items 110 generated for each mapped location in the worksite 20, with each of the 16 reference items 110 being angularly spaced in 22.5 degree increments about the reference vector 88 or other frame of reference. The reference items 110 that correspond to the same reference values 111, but for different angular offsets may be stored at separate memory addresses in the memory system of controller 18. Alternatively such angularly-varying reference items 110 may be derived or inferred from a single stored set of reference data 109 for the location in worksite. This may be achieved by biasing an index n so as to read a distance value, d(n), corresponding to an angular offset, β. This, in effect, results in controller 18 reading a reference item corresponding to a different angular offset, β.

As machine 10 moves within the worksite 20, machine 10 records input data 102 from a Lidar scan of its surrounding environment so that the machine 10 can determine its position within the worksite. Controller 18 analyzes the input data 102 by comparing it with the reference data 109 of each reference 110 to identify a reference data 109 to which the input data 102 is closely correlated. From the comparison, controller 18 identifies a best match between the input data and a reference item 110. Since each reference 110 corresponds to a unique position in worksite 20 (in terms of location and orientation), controller 18 determines a position of machine 10 based on the corresponding reference position 134 of the reference data 109 that is correlated with the input data 102. The embodiment exemplified herein uses input data 102 comprised of measured distance values 104. However, in other embodiments the input data 102 may define a characterizing feature of the Lidar survey derived by applying a mathematical function or algorithm to the distance data measured distance values 104. In embodiments in which the input data 102 defines information extracted from the measured distance values 104, the reference data 109 may represent information extracted from corresponding the set of reference distance values 111, by applying the same mathematical function or algorithm used to derive the input data 102. In such a case, the extracted information may be stored as the reference data 109 instead of reference distance values 111.

During operation, positioning system 30 determines the position of machine 10 by comparing the input data 102 with comparison data. The comparison data represents reference data 109 for an area or areas on the map that constitute a subset of the area represented by the worksite data 108. Thus the comparison data may thus be considered to be a reference dataset consisting of N reference items 110, from ref(1) to ref(N), where N is less than the M members of the worksite data 108. In one embodiment, the reference items 110 that constitute the comparison data are dynamically generated as required, based on a corresponding reference position 134, which may also be dynamically generated. Therefore, the entire dataset of N reference items 110 need not be stored in memory at any one time. The composition of the comparison data is variable with time, to enable a different composition of reference items 110 each time the comparison data is it compared with the input data. During a tracking mode of the position system 30, the comparison data is a subset of worksite data 108 that is dynamically derived based on the most recently determined position of the machine 10. More specifically, during the tracking mode, the comparison data is dynamically derived to be limited to those references 110 that are associated with positions in the worksite that are near the most recently determined position. However, when the positioning system is first initialized (or if the positioning system loses track of the machine 10's position), there will be no relevant position on which such comparison data may be derived. In such situations, the position system compares the input data 102 with first comparison data 128 that is based on predetermined reference positions 134 which are specifically selected for the purpose of determining an initial position of the machine position. Once determined, the initial position is used to seed the positioning system in its position tracking mode.

The first comparison data 128 used for position initialization, is exemplified herein as a "first set of reference data", consisting of one or more reference items 110, each of which are associated with a Lidar survey of a corresponding landmark at a fixed location in the worksite 20. The landmark or landmarks are selected during installation of the positioning system 30, so the first set of reference data is independent of any positions of machine 10 that may have previously been determined by positioning system 30. The reference items 110 for the first set of reference data are selected to be relatively distinct compared with other reference items 110 of the worksite data 108, so to assist positioning system 30 in identifying a single reference item 110 corresponding to input data 102, and thus identify a single position in the worksite 20 associated with machine 10.

Figure 4:
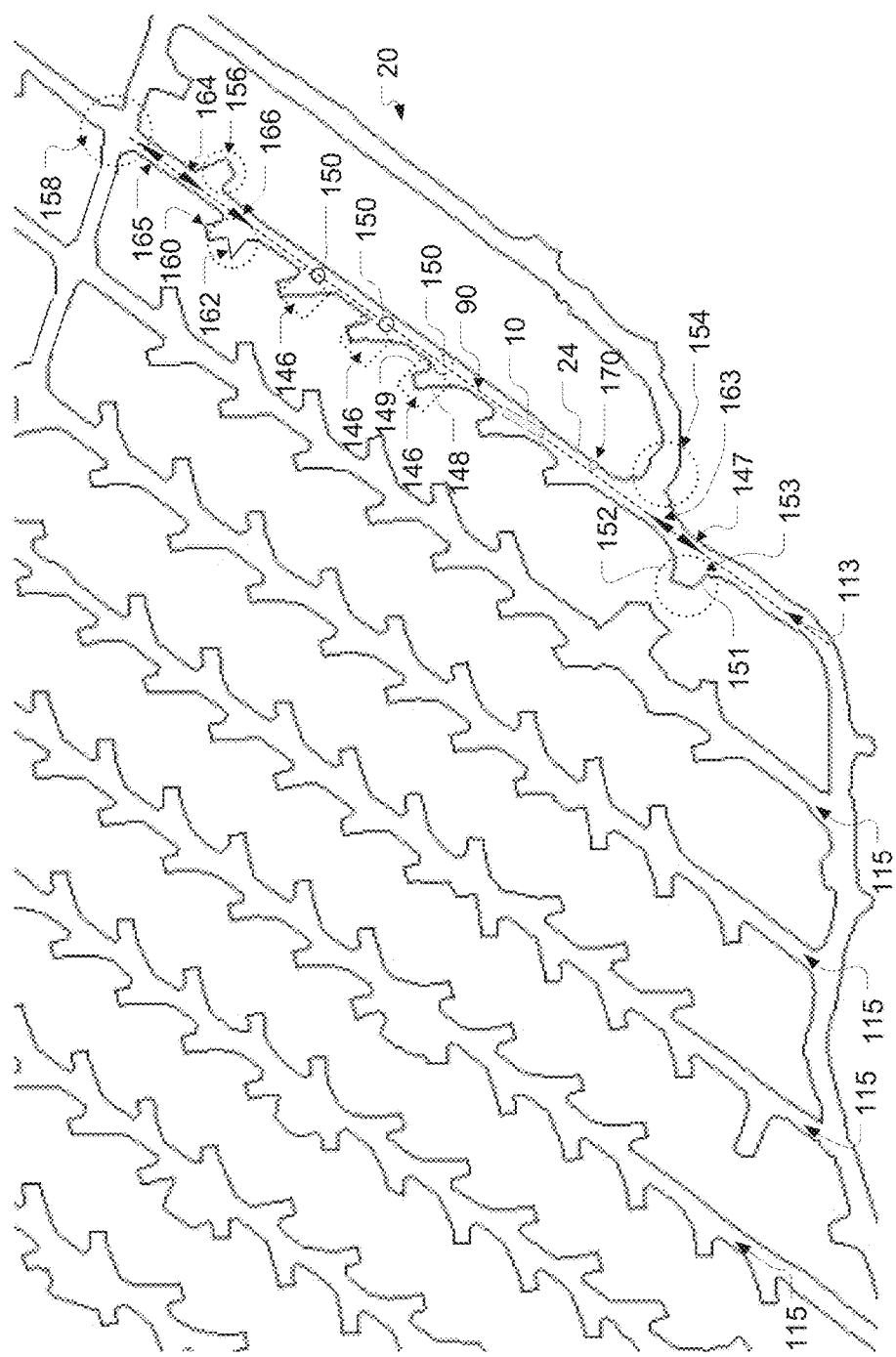
FIG. 4 is a pictorial illustration of a worksite in which the positioning system of FIG. 2 may operate.

FIG. 4 illustrates a worksite 20 of a mine having a plurality of tunnels 113, 115. Machine 10 is assigned to operate a tunnel 113 and portions of the worksite branching therefrom, such as drawpoints 146 for loading ore, and ore pass 153 for dumping ore. Since it may be known that the machine 10, the first set of reference data may optionally be confined to include only such reference data 109 that corresponds to worksite positions in the assigned tunnel 113. Further, the first set of reference data excludes any reference data 109 that tends to be similar to other reference data 109 in the tunnel 113. For example, branching from tunnel 113 are drawpoints 146. Each drawpoint 146 branches from the tunnel 113 in a similar manner, having a first, front sidewall 148 making extending from the tunnel 113 at an acute angle, and a second, rear sidewall 149 extending at a similarly directed acute angle or at a right angle with respect to the tunnel 113. Opposite each of the drawpoints 146 is a substantially flat wall 24. Thus, reference data 109 corresponding to positions 150, adjacent respective drawpoints 146 is similar, and is difficult to distinguish by software. However, ore pass 153, on the other hand, has a first, front wall 151 and a second, rear wall that taper towards each other from the tunnel 113, and ore pass 153 is configured for dumping ore. Thus, at ore pass 153, the worksite 20 has a shape that is distinctive compared with other parts of the tunnel, such as drawpoints 146. Thus a Lidar survey at position 147, adjacent orepass 153, will be distinctive compared with Lidar surveys at positions 150 adjacent the respective drawpoints 146. Due to this distinctiveness, ore pass 153 may function as a landmark for locating the machine. Thus a reference item corresponding to a lidar scan for a machine at position 147 is included in the first set of reference data. As indicated in FIG. 4, this reference item 110 for position 147 corresponds to an orientation of the machine that is directed away from drawpoints 146.

Optionally, an additional or alternative reference item 110 may be included in the first set of reference data. For example a reference item 110 may be included for a similar location but different orientation as position 147, so as to provide a Lidar reference of the ore pass 153 from another perspective. Other landmarks in the tunnel include air vent 154, storage area 156, crossroad or road intersection 158, and unique cutaway 162 (which may be located in drawpoint 160), with the first set of reference data including reference items 110 for positions 163, 164, 165 and 166, respectively corresponding to each of the these landmarks. Optionally a landmark may be created by including an object 170 at a specific location in the worksite to create a distinctive Lidar scan at a position in the worksite adjacent the object 170, and a corresponding reference item 110 may be included in the first set of reference data. The first set of reference data may consist of one or more reference items 110 corresponding to any one or more of the aforementioned landmarks and/or other distinctive landmarks that may exist in the worksite. The positions associate with the respective reference items are at the landmarks, e.g. within 3 meters of the landmark, so that the landmark is well represented in the reference data. Thus, the landmark may be represent a large portion, e.g. one quarter or more, of a reference data.

The selection of reference items 110 in the first set of reference data may be achieved by selecting one or more positions 134 at which a Lidar scan captures chosen landmark(s) from worksite data 108. The reference data 110 corresponding to those positions 134 may then be generated. In other embodiments, landmark(s) may be chosen, and a corresponding set of reference items 110 may be captured from a separate set of Lidar scans, independent from the Lidar scans upon which the worksite data 108 is derived. In one embodiment, the landmarks and are chosen by inspection of the worksite during installation and setup of positioning system 30.

INDUSTRIAL APPLICATION

Figure 5:
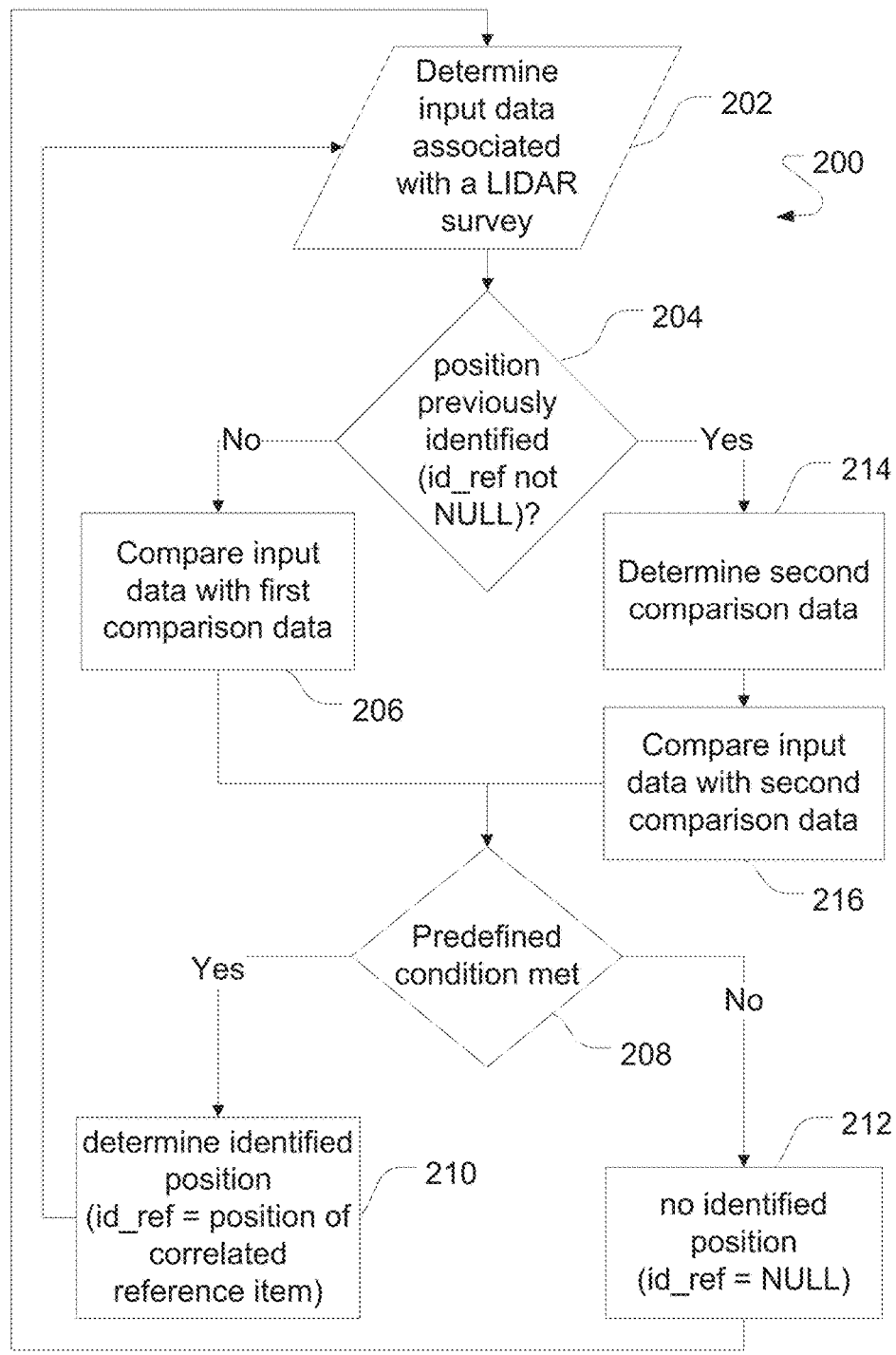
FIG. 5 is a flowchart depicting an exemplary disclosed positioning method.

FIG. 5 illustrates a position determination process 200 performed by controller 18 to determine an initial, first position of the machine, and subsequent positions thereafter. The first position is used to seed a position system 30 to assist the positioning system 30 when the position is entirely unknown, or when the positioning system 30 loses track of the machine's position. According to process 200, a parameter id_ref, which stores a most recently identified reference item 110. However, when the positioning system 30 is initialized id_ref is set to NULL since no reference item 110 has yet been identified. At step 202, positioning system 30 determines input data 102 associated with a Lidar survey from the current position of the machine. Since, no reference item 110 has been identified, step 204 directs the process to determine an initial position for seeding the positioning system 30. Accordingly, at step 206, the input data is compared with a first set of reference data at step to determine the position of the machine 10. The first set of reference data is composed of landmark-related reference items selected for seeding. At step 208, if the comparison meets a predefined condition, then the process proceeds to step 210 by identifying a reference item 110 that matches the input data 102. The predefined condition is that at least one reference item 110 is determined to match the input data 102. The reference item 110 that is best correlated with the input data 102 (or the reference identifier 118 or reference position 134 associated with that reference item 110) is saved into position identifier parameter, id_ref, 132. The positioning system 30 thus knows that the machine 10 is at the identified reference position 134. When the machine moves to a new position, or at some incremental time later, the input data 102 is updated from a new Lidar survey. The process 200 returns to step 202 to determine the new input data 102. At step 204, the positioning system then reconsiders whether a reference item has been identified (i.e. whether a position has been determined).

Once a reference item has been identified, step 204 directs the process 200 to compare the input data with second comparison data 130 that is different to the first comparison data 128. The second comparison data 130 is exemplified herein as a different, second set of reference data, intended for tracking the position of the machine, rather than seeding the initial position. At step 214, the composition of the second set of reference data is selected. This is achieved by selecting reference positions 134 that have a proximal relationship to the reference position 134 of the reference item identified in step 204. Each of the reference data 109 may be derived and collectively stored to form a complete second set of reference data that is then compared with the input data. Alternatively, each reference data 109 associated with the second set may be generated, compared with the input data, and then erased, before the next reference data 109 in the second dataset is generated, compared and erased. Therefore, the determination and generation of the second set of reference data may occur concurrently with the comparison of the second set of reference data the input data 102. In any case, the second set of reference data represents a subset of the worksite data 108. The selected subset is determined based on the most recently identified reference item, which is identified by id_ref. More specifically, the subset is selected to include only reference items 110 which have a corresponding position within some predefined proximity to the position of the most recently identified reference item. For example, in one embodiment, the second set of reference items 110 is limited to only those reference items determined to correspond with positions within a 10 meter radius of the position corresponding to identified reference item. At step 216, the updated input data 102 is compared with the second set of reference data to identify a reference item 110 matching the updated input data.

At step 208, the comparison of the input data 102 with the first or second set of reference data, whichever may be the case, may fail to meet the predefined condition. Such a situation occurs if there is no reference item in the reference dataset that matches the input data 102. In this case, id_ref is set to NULL. Thus, in the next iteration of the process 200, the positioning system again compares the updated input data 102 with the first set of reference data to re-seed or to re-attempt the initial seeding of the positioning system 30. Reseeding is required in the event that the positioning system loses track of the machine's position. A re-attempt for the initial seeding is required if no initial position was determined, as will be the case if the previous input data corresponded to a position in the worksite that was not at one of the landmarks included the first set of reference data. The process 200 will in this case iteratively repeat by comparing continuously updated input data with the first set of reference data until the machine 20 passes one of the landmarks included in the first set of reference data and matches (to a predefined level of correlation) with a reference item 110 corresponding to the landmark. Once such a match occurs, the positing system 30 will transition to its position tracking mode.

Figure 6:
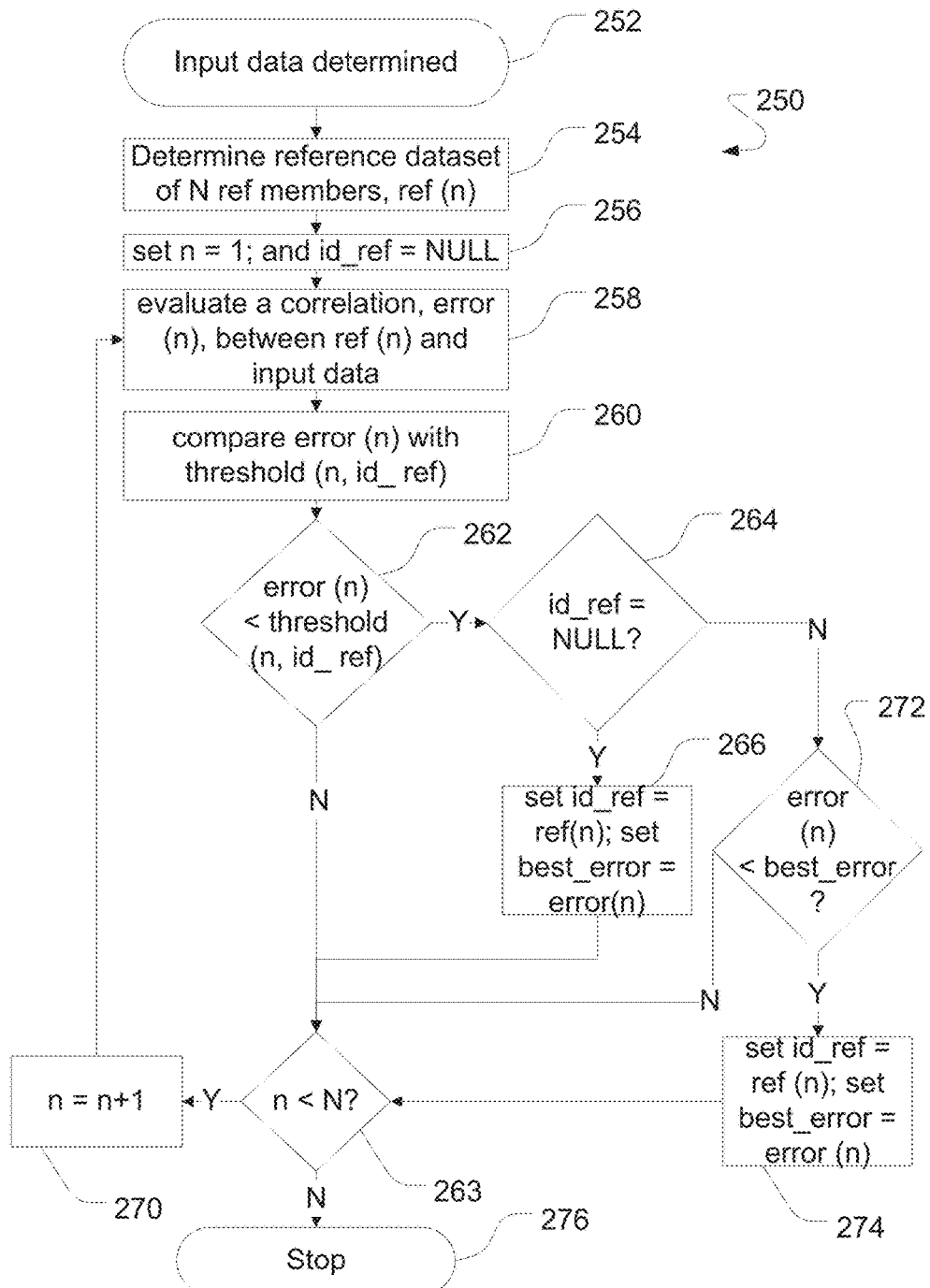
FIG. 6 is a flowchart depicting an exemplary correlation algorithm used to perform part of the positioning method of FIG. 5.

Correlating the input data 102 with the reference dataset (e.g. the first or second comparison data) and identifying a match may be performed using any number of shape-matching or pattern-matching algorithms, image recognition software, and other methods known in the art. As an exemplary embodiment, FIG. 6 illustrates an algorithm 250, performed by controller 18, for comparing the input data 102 with a reference dataset, consisting of or corresponding to N reference items, ref(n). The comparison determines whether or not the input data matches a reference item 110 associated with the reference dataset. If more than one reference item 110 matches the input data 102, the controller identifies the best, closest match. The algorithm 250 begins at 252 when new input data is determined. A reference dataset is determined at 254 to consist of first comparison data 128 or second comparison data 130, defining specific reference positions 134 and thereby specific reference items 110 to be represented by the reference dataset, as described for process 200. At step 256 the algorithm 250 is initialized by setting index n to 1 so as to index the first reference item, ref(1) in the reference dataset. Also, position identifier id_ref is set to NULL to indicate that no matching reference item 110 has yet been identified for the new input data 102. Next, the reference data 109 is generated to be represent data indicative of a Lidar scan from the reference position 134 associated with that reference item 110, and a correlation between the input data 102 and the reference data 109 of the indexed referenced member 110 is evaluated at step 258. In one embodiment, the evaluation is performed directly on the distance data, rather than on a characterizing feature extracted from the distance data. That is, the input data consists of measured distance values 104 and each reference data 109 consists of reference distance values 111. The evaluation, involves calculating an error that represents a difference between the input data 102 and the reference data 109 of the indexed reference item 110. The absolute differences between corresponding elements of the input data 102 and reference data 109 datasets are summed to determine the error(n) for the indexed, nth reference item 110 in the reference dataset. This may be calculated according to the following equation.

$$\text{error}(n) = \sum_{i=1}^{S} |D(i) - d_n(i)|$$

where:
n is the nth reference item in the reference dataset;
error(n) is the error of the nth reference remember, compared with the input data;
D(i) is the input data;
$d_n(i)$ is the reference data for the nth reference item;
i is the ith distance value in each of the input data and the reference data; and
S is the number of distance values in the each of the input data the reference data.

However, in some embodiments the input data and reference data may include a great range of distance values. For example in embodiments were the Lidar unit 32 has a 360 degree field of view, some of the distance values may be in the order of one or two meters, corresponding to an adjacent wall 24 of the tunnel, while other distance values may be in the order of 100 meters corresponding to a longitudinal end of the tunnel 113. For such situations the error in the calculation in the above equation may exclude values of D(i) minus $d_n(i)$ that outside of a predetermined range, eg 0 to 5 meters. Additionally, or alternatively the distance values in D(i) and $d_n(i)$ may be limited to those values corresponding to angles within a predefined spread from a reference direction.

Next, at step 260, the evaluated correlation, error(n), is compared with a threshold. The threshold is denoted in FIG. 6 as threshold (n, id_ref) because the threshold can vary depending on each reference item 110 in the reference dataset (e.g. depending in the reference identifier 118 indexed by index n). For example, different thresholds may be selected for respective reference items corresponding to different landmarks. Additionally or alternatively, the threshold can vary depending on whether a reference item 110 has previously been identified. For example, a first threshold may be selected if the positioning system 110 is in a position seeding mode (i.e. id_ref is NULL), and a second threshold may be selected if the positioning system 30 is in a position tracking mode (i.e. id_ref is not NULL). Additionally or alternatively, different weighting factors may be applied to the error calculations for respective reference items depending on the index n and/or id_ref. The various weighting factor(s) and/or thresholds are determined during installation of positioning system 30. In one embodiment, the thresholds and/or weighting factors are determined and optimized by experimentation to set the positioning system to a sensitivity level that is suited to the particular worksite 20 and landmarks therein.

The test for comparing the error with the threshold is illustrated at step 262. Specifically, if the error is less than the threshold, the reference item 110 is determined to be correlated and is considered to be a match. Otherwise the reference item 110 is determined not to be a match. If the reference item 110 is not a match, the controller 18 proceeds to step 263 by checking whether there are more reference items 110 in the reference dataset. If there are more members (i.e. n is less than N), the index n is incremented to n+1 to index the reference position 134 of the next reference item 110 in the reference dataset. In some embodiments the next reference item is calculated dynamically by determined calculating a coordinate some predefined distance and direction from the previously indexed reference position. In either case, the reference data 109 for that next reference item 110 is then generated from the worksite map (if the reference data 109 is not stored in memory system 19), and the evaluation 258 and comparison 260 is subsequently repeated for that reference data 109. If at step 262, the error is less than the threshold, the correlation is determined to be a match, directing the controller 18 to execute step 264. At step 264, the controller 18 checks whether a previous match has been found. If no match has yet been found (i.e. id_ref=NULL), the indexed reference item is identified as being the best match yet identified. The controller 18 then saves the indexed reference item is or the index n to id_ref at step 266, and saves the error(n) to a register, best_error. The controller 18 then checks at step 263 whether there are more reference items 110 in the reference dataset by checking whether n is less than N. In one embodiment, N represents or corresponds to a maximum distance, e.g. 10 meters, from the reference position 134 stored in id_ref. In this manner the set of reference data can be limited to be proximal to any previously identified reference position. If there are more reference items, the index n is incremented at step 270 and the evaluation 258 and comparison 260 are repeated for the next reference item 110 in the reference dataset. However, this time, id_ref is not NULL, so if a further match is found, the error, error(n), is compared the value stored in best_error at 272. If error(n) is less than best_error, this reference item is more closely correlated with the input data than the last identified reference item. Therefore, at step 274 ref(n) or its index n is stored to id_ref and error(n) is stored to best_error. If there are no more reference items in the reference dataset, then the algorithm finishes at 276. The position of the machine 10 can then be identified according to the best matching reference item, as identified by id_ref. Alternatively, if id_ref is NULL, the controller 30 identifies that the position is unknown for this input data 102. The algorithm 250 may then be repeated for by new input data 252.

In situations where a worksite 20 includes similar features in various locations or consists of a repeating layout, a lidar based positioning system may have difficulty finding a unique match between input data 102 for a current machine position and reference data corresponding to a Lidar map of the worksite. This difficulty is particularly evident in determining an initial position for the positioning system. For example, if controller 18 were to use worksite data 108, positioning system 30 may not be able to determine the position of machine 10 with certainty and/or great accuracy or efficiency. For example, as shown, in FIG. 4, the shape of the worksite from the perspective of positions 150, adjacent respective drawpoints, is substantially similar. If machine 10 is at one of drawpoints 146, Lidar data taken from that position may be indistinguishable from any of the other drawpoints 146, or at least sufficiently indistinguishable such that positioning system cannot determine a unique position for the machine 10. Nonetheless, such a position system may identify a the wrong position as being the best match due to limitations in the matching algorithm. Further, the matching algorithm may not be optimized to identify those parts of the worksite which do have unique in shape. Further the computational demands on the processing system may be excessive if the reference data corresponds to a Lidar map for the entire worksite.

Processing system 30, however, using process 200 and algorithm 250, reduces the number of reference positions used for determining an initial position to only those reference positions in the worksite at which there is a distinctive shape for identification as a landmark. Landmarks may be at separated locations dispersed in the worksite, so that regardless of the position of machine 10 at any given time, it is always relatively close to a landmark and therefore close to a reference position 134 of the first comparison data 128 at which position the Lidar tracking system can be seeded. Since the reference positions 134 of the first comparison data 128 are dispersed within the worksite to be at the dispersed landmarks, the comparison data does not include non-distinctive reference data that may result in an inaccurate position determination. The landmarks provides each reference data in the first comparison data with a uniqueness which may assist the matching algorithm in efficiently and/or reliably determining an initial position. The landmarks included in the first comparison data may selected by identifying unique shapes in a worksite map or in the worksite itself.

It will be understood that the disclosure in this specification extends to all alternative combinations of two or more of the individual features mentioned or evident from the text or drawings. All of these different combinations constitute various alternative aspects of the disclosure.

The invention claimed is:

1. A method for determining a position of a machine in a worksite, the method comprising:

determining, using a Lidar unit on the machine, input data associated with distances between the Lidar unit and respective light-reflective points in the worksite;

comparing the input data with first comparison data including at least one reference data set indicative of distances between at least one reference position and the respective light-reflective points in the worksite, the at least one reference position having a fixed location in the worksite; and determining a first position of the machine based on the first comparison data when the input data and the at least one reference data set satisfy a predefined condition, wherein comparing the input data and the at least one reference data set includes:

determining a correlation between the input data and the at least one reference data set; and comparing the correlation with a threshold, and wherein the predefined condition includes the correlation is less than the threshold.

2. The method according to claim 1, wherein the at least one reference data set has an associated identifier, and the method further includes determining the threshold based on the associated identifier.

3. The method according to claim 1, wherein the input data is first input data, and the method further includes:

determining, using the Lidar unit, second input data associated with the distances between the Lidar unit and the respective light-reflective points in the worksite when the machine is located at a second position different from the first position;

determining second comparison data based on the first position; and comparing the second input data with second comparison data to determine the second position.

4. The method according to claim 3, wherein determining the second comparison data includes:

identifying reference positions having spacings from the first position that are less than a threshold spacing; and including reference data sets corresponding to the reference positions in the second comparison data.

5. The method according to claim 4, wherein the correlation is a first correlation, the threshold is a first threshold, and comparing the second input data with the second comparison data includes:

determining a second correlation between the second input data and at least one second reference data set selected from the second comparison data, and comparing the second correlation with a second threshold.

6. The method according to claim 5, wherein the second threshold is different from the first threshold.

7. The method according to claim 1, wherein the at least one reference data set is a first reference data set corresponding to a first reference position and the first comparison data includes a second reference data set corresponding to a second reference position, comparing the input data with the first comparison data includes:

determining a first correlation between the input data and the first reference data set;

determining a second correlation between the input data and the second reference data set;

determining a first difference between the first correlation and a threshold, and determining a second difference between the second correlation and the threshold, and determining that the first position is the first reference position when the first difference is smaller than the second difference.

8. The method according to claim 1, wherein the first comparison data includes a plurality of reference data sets corresponding to a plurality of reference positions, the reference positions being separated from each other in the worksite.

9. The method according to claim 1, wherein the method includes determining the first comparison data during an installation of a positioning system in the worksite.

10. The method according to claim 1, wherein the at least one reference position is one of an ore pass, a distinctive marker added to the worksite, a unique cutaway, an air vent, a road intersection, and a storage area cut into a sidewall of a tunnel in the worksite.

11. The method according to claim 1, wherein the input data is first input data, the position of the machine is an initial position, and when the first input data and the at least one reference data set do not satisfy the predefined condition, the method further includes:
 determining, using the Lidar unit on the machine, second input data associated with the distances between the Lidar unit and respective light-reflective points in the worksite from a new position of the machine different from the initial position;
 comparing the second input data with the first comparison data; and
 determining the first position of the machine based on the first comparison data when the second input data and the at least one reference data set satisfy the predefined condition.

12. A system for determining a position of a machine in a worksite, the system comprising:
 a Lidar unit attached to the machine;
 a controller in communication with the Lidar unit, the controller being configured to:
 receive, from the Lidar unit, input data associated with distances between the Lidar unit and respective light-reflective points in the worksite;
 compare the input data with first comparison data including at least one reference data set indicative of distances between at least one reference position and the respective light-reflective points in the worksite, the at least one reference position having a fixed location in the worksite; and
 determine a first position of the machine based on the first comparison data when the input data and the at least one reference data set satisfy a predefined condition, wherein the at least one reference data set is a first reference data set corresponding to a first reference position and the first comparison data includes a second reference data set corresponding to a second reference position, and the controller is further configured to:
 compare the input data with the first comparison data by:
 determining a first correlation between the input data and the first reference data set;
 determining a second correlation between the input data and the second reference data set;
 determining a first difference between the first correlation and a threshold, and
 determining a second difference between the second correlation and the threshold, and
 determine that the first position is the first reference position when the first difference is smaller than the second difference.

13. The system according to claim 12, wherein the controller is further configured to:
 compare the input data and the at least one reference data set by:
 determining a correlation between the input data and the at least one reference data set; and
 comparing the correlation with a threshold, and
 determine that the input data and the at least one reference data set satisfy the predefined condition when the correlation is less than the threshold.

14. The system according to claim 13, wherein the at least one reference data set has an associated identifier, and the method further includes determining the threshold based on the associated identifier.

15. The system according to claim 12, wherein the at least one landmark is one of an ore pass, a distinctive marker added to the worksite, a unique cutaway, an air vent, a road intersection, and a storage area cut into a sidewall of a tunnel in the worksite.

16. The system according to claim 12, wherein the input data is first input data, the position of the machine is an initial position, and the controller is further configured to:
 receive, from the Lidar unit, second input data associated with the distances between the Lidar unit and the respective light-reflective points in the worksite when the machine is located at a second position different from the first position;
 determine second comparison data based on the first position; and
 compare the second input data with second comparison data to determine the second position.

17. The system according to claim 16, wherein the controller is configured to determine the second comparison data by:
 identifying reference positions having spacings from the position that are less than a threshold spacing; and
 including reference data sets corresponding to the reference positions in the second comparison data.

* * * * *